W. F. WARE.
INHALER.
APPLICATION FILED JUNE 18, 1915.

1,165,473.

Patented Dec. 28, 1915.

WITNESS
F. J. Hartman,

INVENTOR
Walter F. Ware.

BY
ATTORNEYS

UNITED STATES PATENT OFFICE.

WALTER F. WARE, OF HADDONFIELD, NEW JERSEY.

INHALER.

1,165,473. Specification of Letters Patent. Patented Dec. 28, 1915.

Application filed June 18, 1915. Serial No. 34,816.

*To all whom it may concern:*

Be it known that I, WALTER F. WARE, a citizen of the United States, and a resident of Haddonfield, county of Camden, State of New Jersey, have invented certain new and useful Improvements in Inhalers, of which the following is a description.

My invention relates to inhalers and particularly to the construction thereof whereby the contents may be readily kept substantially sealed when not in use without the employment of ordinary forms of closures, such as removable corks, removable caps, screw tops or the like.

Figure 1:
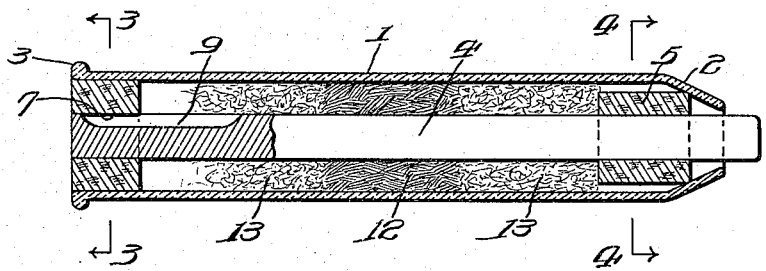
Figure 2:
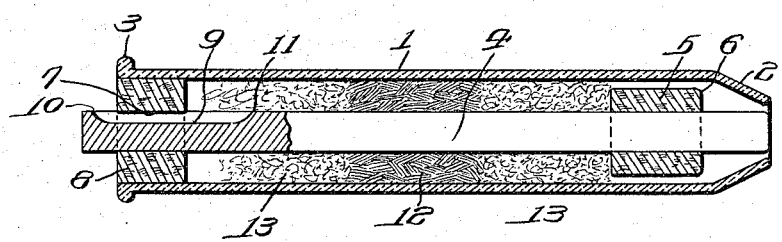
Figure 3:
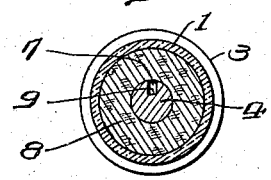
Figure 4:
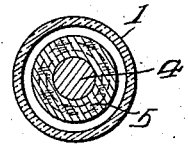

In the drawings forming a part of the specification and in which the same reference characters are used to designate the same parts throughout the various views, Figure 1 is a longitudinal section through my improved inhaler, the same being shown in its closed or sealed position; Fig. 2 is a similar longitudinal section showing the position of the parts when the device is ready for use as an inhaler; Fig. 3 is a transverse cross-sectional view taken on the line 3—3 of Fig. 1; and Fig. 4 is a transverse cross-sectional view taken on the line 4—4 of Fig. 1.

The inhaler, forming the subject-matter of this application, comprises a casing 1, preferably substantially cylindrical throughout the major portion of its length, terminating in a tapering or reduced portion 2 at one end, and a flange 3 at the other end. This casing 1 is preferably made of glass tubing, but, of course, it may be made of hard rubber or any other suitable material. The interior of the casing 1 is preferably circular in cross-section, the inner surface, at the tapering or reduced end 2 thereof, being preferably conical.

Within the casing 1 and coaxial with the interior bore thereof is a rod 4, which is a little longer than the total length of the casing 1, so that a short portion of the rod 4 will always extend beyond either one or the other end of the casing. Near one end of said rod 4, and immovably secured with respect thereto, is a plunger 5, preferably made of cork or other suitable yielding material, the outer diameter of which plunger is less than the inner diameter of the cylindrical portion of the casing 1. This plunger 5 is arranged to be moved with and by the rod 4 against and away from a position in which its edge 6 is against and in engagement with the tapered interior surface of the reduced end 2 of the casing. The said rod 4 fits snugly within an opening 7 through the head 8, preferably made of cork or other suitable material tightly fitted into the flanged end of the casing 1, said rod 4 being, however, arranged to slide freely through said opening 7. Said rod 4 is also preferably provided with a slot 9, extending longitudinally of said rod, from a point 10, adjacent but spaced from that end of the rod 4 which passes through the cork 8, and to a point 11. The slot 9, so provided, is longer than the head 8 through which the rod 4 is adapted to slide.

Between the plunger 5 and the head or closure 8, is placed the salts, or mentholic preparations 12 usually placed in these inhalers, and the same is preferably retained in substantially the middle of the casing 1 by loosely packed antiseptic wool 13, interposed between the preparation 12 and the head 8 and plunger 5.

When the parts above described are assembled, with the preparation 12 contained therein between the wool 13, the inhaler may be kept in a closed or sealed condition by pushing on the rod 4 until the plunger 5 engages the inner conical surface of the casing 1, as shown in Fig. 1. In this position the other end of the rod 4 will be substantially flush with the outer surface of the head or closure 8, and, therefore, the contents are practically sealed.

To use the device as an inhaler, it is only necessary to push the end of the rod 4, shown as projecting in Fig. 1, inwardly to the position shown in Fig. 2. This motion of the rod 4 carries with it the plunger 5 and separates its edge 6 from the conical surface upon which it was seated, and inasmuch as the plunger 5 is of smaller diameter than the bore of the major portion of the casing 1, a clear air-passage between the interior of the casing 1 and the exterior of the plunger 5 is thus provided. This motion of the rod 4 brings the end 10 of the slot 9 clear and beyond the end of the head 8. An air-passage through said slot from the outside to the interior of the casing 1 is thus provided. With the parts disposed in the manner shown in Fig. 2, the device may be used as an inhaler in the ordinary way. After using the device as an inhaler, the end of the rod, shown as projecting in Fig. 2, may be pushed inwardly, carrying the edge 6 of the plunger 5 back into engagement with the tapered interior of the casing 1 and bringing the outer end 10 of the slot 9 below the outer surface of the end of the head 8.

It is to be understood, of course, that if desired, any other yielding substance than cork may be used for the head 8 and the plunger 5 so long as the plunger 5 may be fixedly secured to the rod 4 to be moved by it into and out of engagement with the interior of the casing, and so long as the rod 4 is free to slide through the head 8 which is forced into and is stationary with respect to the casing 1.

Any suitable volatile substance, such as aromatic salts, camphor compositions or mentholic preparations may be placed in the casing and the strength of said substance may be retained for long periods by reason of the fact that the container or tube may be kept in a closed or sealed condition whenever the inhaler is not being used.

The purpose of the packing of wool between the ends of the tube and the volatile material is to keep the volatile material positioned in substantially the middle of the tube and at the same time to allow air to pass relatively freely therethrough and over through the volatile substance when the device is used as an inhaler. Fine lamb's wool is very elastic and will not pack down with the movement of the plunger. Its resiliency permits it to follow the plunger without packing. It is for this reason that wool is preferably used as the porous material for keeping the volatile substance at the middle of the tube, but, if so desired, other porous substances, such as antiseptic cotton, antiseptic gauze, or similar materials may be substituted therefor without departing from the spirit and scope of my invention.

Having thus described my invention, what I claim and desire to protect by Letters Patent of the United States, is:

1. In an inhaler, the combination of a casing having an interior tapered seat near one end thereof, a closure having an opening therethrough fixedly secured to the other end of said casing, a rod snugly fitting within and slidable through said opening, and a plunger smaller in diameter than the interior of said casing fixedly secured to said rod adjacent said seat, said rod being provided with a slot longer than the thickness of said closure, the outer end of said slot being within said opening when said plunger is on said seat.

2. In an inhaler, a casing having a cylindrical portion and having a tapered conical end providing an interior seat, a plunger in said casing of smaller diameter than the interior of the cylindrical portion of said casing, a closure for the other end of said casing and a rod passing through said closure and fixedly secured to said plunger for moving said plunger into and out of engagement with said seat, said rod being provided with a slot forming an air passage through said closure when said plunger is moved away from said seat and closed by said closure when said plunger is on said seat.

3. In an inhaler, a casing having a cylindrical portion and having a tapered conical end providing an interior seat, a plunger in said casing of smaller diameter than the interior of the cylindrical portion of said casing, a closure for the other end of said casing, a rod passing through said closure and fixedly secured to said plunger for moving said plunger into and out of engagement with said seat, said rod being provided with a slot forming an air passage through said closure when said plunger is moved away from said seat and closed by said closure when said plunger is on said seat, a volatile substance in said casing, and porous material between said substance and said closure and said plunger respectively.

4. In an inhaler, a casing having a cylindrical portion and having an interior seat near one end thereof, a closure at the other end of said casing fixedly secured to said casing, a rod longer than said casing, and a plunger of yielding material and of smaller diameter than the interior of the cylindrical portion of said casing secured to said rod, said rod being provided with a slot longer than said closure and having its outer end adjacent but spaced from the end of said rod, the end of said rod passing through said closure being substantially flush with the outer end of said closure when said plunger is against said seat.

5. In an inhaler, a casing having a cylindrical portion and having an interior seat near one end thereof, a closure at the other end of said casing fixedly secured to said casing, a rod longer than said casing, and a plunger of yielding material and of smaller diameter than the interior of the cylindrical portion of said casing secured to said rod, said rod being provided with a slot longer than said closure and having its outer end adjacent but spaced from the end of said rod, the end of said rod passing through said closure being substantially flush with the outer end of said closure when said plunger is against said seat, the other end of said rod projecting beyond the opposite end of said casing a distance sufficient to bring the outer end of the said slot clear of and beyond the end of said closure when said end of said rod is moved to lift said plunger from said seat.

In witness whereof, I have hereunto set my hand this 17th day of June, A. D. 1915.

WALTER F. WARE.